United States Patent
Lin et al.

(10) Patent No.: US 10,290,085 B2
(45) Date of Patent: May 14, 2019

(54) IMAGE HOLE FILLING THAT ACCOUNTS FOR GLOBAL STRUCTURE AND LOCAL TEXTURE

(71) Applicant: ADOBE INC., San Jose, CA (US)

(72) Inventors: Zhe Lin, Fremont, CA (US); Xin Lu, Mountain View, CA (US); Chao Yang, Los Angeles, CA (US)

(73) Assignee: Adobe Inc., San Jose, CA (US)

( * ) Notice: Subject to any disclaimer, the term of this patent is extended or adjusted under 35 U.S.C. 154(b) by 106 days.

(21) Appl. No.: 15/379,337

(22) Filed: Dec. 14, 2016

(65) Prior Publication Data

US 2018/0165798 A1 Jun. 14, 2018

(51) Int. Cl.
*G06T 5/00* (2006.01)
*G06K 9/62* (2006.01)

(52) U.S. Cl.
CPC ............ *G06T 5/005* (2013.01); *G06K 9/6267* (2013.01); *G06T 2207/10024* (2013.01); *G06T 2207/20081* (2013.01); *G06T 2207/20084* (2013.01)

(58) Field of Classification Search
CPC ...... G06K 9/66; G06K 9/4628; G06K 9/6256; G06K 9/627; G06K 9/6201; G06T 5/005; G06T 7/40; G06T 2207/20081
USPC ....................................................... 382/157
See application file for complete search history.

(56) References Cited

PUBLICATIONS

Yang, et al. (High-Resolution Image Inpainting using Multi-Scale Neural Patch Synthesis),University of Southern California, Adobe Research, Nov. 30, 2016, pp. 1-9.*
Karimi, et al. (Skin Lesion Segmentation in Clinical Images Using Deep Learning), IEEE, Dec. 4-6, 2016, pp. 332-337.*
Bertalmio, et al. (Simultaneous Structure and Texture Image Inpainting), IEEE, Aug. 2003, pp. 882-889.*
C. Barnes, E. Shechtman, A. Finkelstein, and D.B. Goldman. PatchMatch: A randomized correspondence algorithm for structural image editing. TOG, 28(3):24:1-24:11, 2009.
A. J. Champandard. Semantic style transfer and turning two-bit doodles into fine artwork. In arXiv:1603.01768v1, 2016.
L.C. Chen, G. Papandreou, I. Kokkinos, K Murphy, and A.L. Yuille. Semantic image segmentation with deep convolutional nets and fully connected crfs. In ICLR, 2015.

(Continued)

*Primary Examiner* — Daniel G Mariam
(74) *Attorney, Agent, or Firm* — Brake Hughes Bellermann LLP

(57) ABSTRACT

Image hole filling that account for global structure and local texture. One exemplary technique involves using both a content neural network and a texture neural network. The content neural network is trained to encode image features based on non-hole image portions and decode the image features to fill holes. The texture neural network is trained to extract image patch features that represent texture. The exemplary technique receives an input image that has a hole and uses the two neural networks to fill the hole and provide a result image. This is accomplished by selecting pixel values for the hole based on a content constraint that uses the content neural network to account for global structure and a texture constraint that uses the texture neural network to account for local texture. For example, the pixel values can be selected by optimizing a loss function that implements the constraints.

18 Claims, 10 Drawing Sheets

(56) References Cited

PUBLICATIONS

D.A. Clevert, T. Unterhiner, Hochreiter, and S. Fast and accurate deep network learning by exponential linear unites (ELUS). In ICLR, 2016.

A. Criminisi, P. Pérez, and K. Toyama. 285 Object removal by exemplar-based inpainting. In IEEE Conference on Computer Vision and Pattern Recognition (CVPR), vol. 2, pp. II-721-II-728 vol. 2, 2003.

A. Dosovitskiy and T. Brox. Generating images with perceptual similarity metrics based on deep networks. In arXiv:1602.02644v1, 2016.

A. A. Efros and T. K. Leung. Texture synthesis by nonparametric sampling. In ICCV, pp. 1033-1038, 1999.

L. A. Gatys, A. S. Ecker, and M. Bethge. A neural algorithm of artistic style. In arXiv:1508.06576v2, 2015.

L. A. Gatys, A. S. Ecker, and M. Bethge. Texture synthesis and the controlled generation of natural stimuli using convolutional neural networks. In NIPS, 2015.

J. Johnson, A. Alahi, and F.F. Li. Perceptual losses for real-time style transfer and super-resolution. In arXiv:1603.08155v1, 2016.

C. Li and M. Wand. Combining markov random fields and convolutional neural networks for image synthesis. In arXiv:1601.04589v1, 2016.

D. Pathak, P. Krähenbühl, J. Donahue, T. Darrell, and A.A. Effros. Context encoders: Feature learning by inpainting. In CVPR, 2016.

K. Ridgeway, J. Snell, B. Roads, R. Zemel, and M. Mozer. Learning to generate images with perceptual similarity metrics. In 330 arXiv:1511.06409v1, 2015.

K. Simonyan and A. Zisserman. Very deep convolutional networks for large-scale image recognition. In ICLR, 2014.

C. Szegedy, W. Liu, Y.Q. Jia, P. Sermanet, S. Reed, D. Anguelov, D. Erhan, V. Vanhoucke, and A. Rabinovich. Going deeper with convolutions. In CVPR, pp. 1-9, 2015.

D. Ulyanov, V. Lebedev, A. Vedaldi, and V. Lempitsky. Texture networks: Feed-forward synthesis of textures and stylized images. In arXiv:1603.03417v1, 2016.

H. Zhao, O. Gallo, I. Frosio, and J. Kautz. Loss Functions for Neural Networks for Image Processing? In arXiv:1511.08861v1, 2015.

\* cited by examiner

IMAGE HOLE FILLING THAT ACCOUNTS FOR GLOBAL STRUCTURE AND LOCAL TEXTURE

TECHNICAL FIELD

This disclosure relates generally to computer-implemented techniques and more particularly relates to improving the efficiency and effectiveness of computing systems used to edit images.

BACKGROUND

Photo editing apps are used to erase distracting scene elements, adjust object positions, recover image content in occluded image areas, etc. In general, these and many other image editing operations require automated hole-filling, which is also referred to as inpainting or image completion. Hole-filling techniques used by photo editing apps generally do not provide satisfactory results. Such techniques often provide hole-filling results that are inconsistent with the local texture outside of the hole and/or that do not fit well with respect to the global structure of$_{[DR1]}$ the image. Traditional patch-based hole filling methods can recreate textures accurately, but the results often fail to match the global structure of the image. For example, a hole may be filled such that a tree trunk or other such shape in the hole that should be relatively straight like the other tree trunks in the image instead is wavy or has irregular side edges. As another example, a hole may be filled such that the edge of a tree trunk or other shape at the hole boundary inside the hole is not aligned with the edge of the tree trunk at the hole boundary.

Existing neural network-based techniques that are used for texture synthesis also do not address the global structure issue encountered in hole filling. Recently neural network-based approaches have been introduced for texture synthesis and image stylization. These approaches generally use a noise vector as input and train a generator network to generate different textures based on texture examples from other images. However, using such techniques to fill holes in an image does not produce hole content consistent with the global structure of the image. Thus, neither patch-based techniques nor the neural network-based techniques adequately address the issue of matching the image's global structure. The hole filling results of such techniques are thus often unrealistic.

On the other hand, global [structure-based]$_{[DR2]}$ techniques used to fill holes are able to estimate the global structure for a hole well, but the predicted texture is often not consistent with the textures outside the hole. For example, encoder-decoder neural networks can be used to identify high level features that represent the global structure of an image and use those features to create content to fill a hole in the image in a way that is consistent with that global structure. However, the patterns and other details of other portions of the image are not included in the filled hole region. The hole filling results of such techniques are thus also often unrealistic.

In sum, existing hole filling solutions that use patch-based and neural network-based approaches do not account for the different problems posed by the local texture and global structure of images. None of the existing hole filling techniques consistently performs well with respect to having the content created to fill a hole match the global structure and local texture of the other portions of the image. Accordingly, the techniques often fail to provide realistic hole filling results.

SUMMARY

Techniques are disclosed herein for image hole filling that account for global structure and local texture. One exemplary technique involves using both a content neural network and a texture neural network. The content neural network is trained to encode image features based on non-hole image portions and decode the image features to fill holes. The texture neural network is trained to extract image patch features that represent texture. The exemplary technique receives an input image that has a hole and uses the two neural networks to fill the hole and provide a result image. This is accomplished by selecting pixel values for the hole based on a content constraint that uses the content neural network to account for global structure and a texture constraint that uses the texture neural network to account for local texture. For example, the pixel values can be selected by optimizing a loss function that implements the content constraint and the texture [constraint]$^{[DR3]}$.

These illustrative features are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Figure 1:
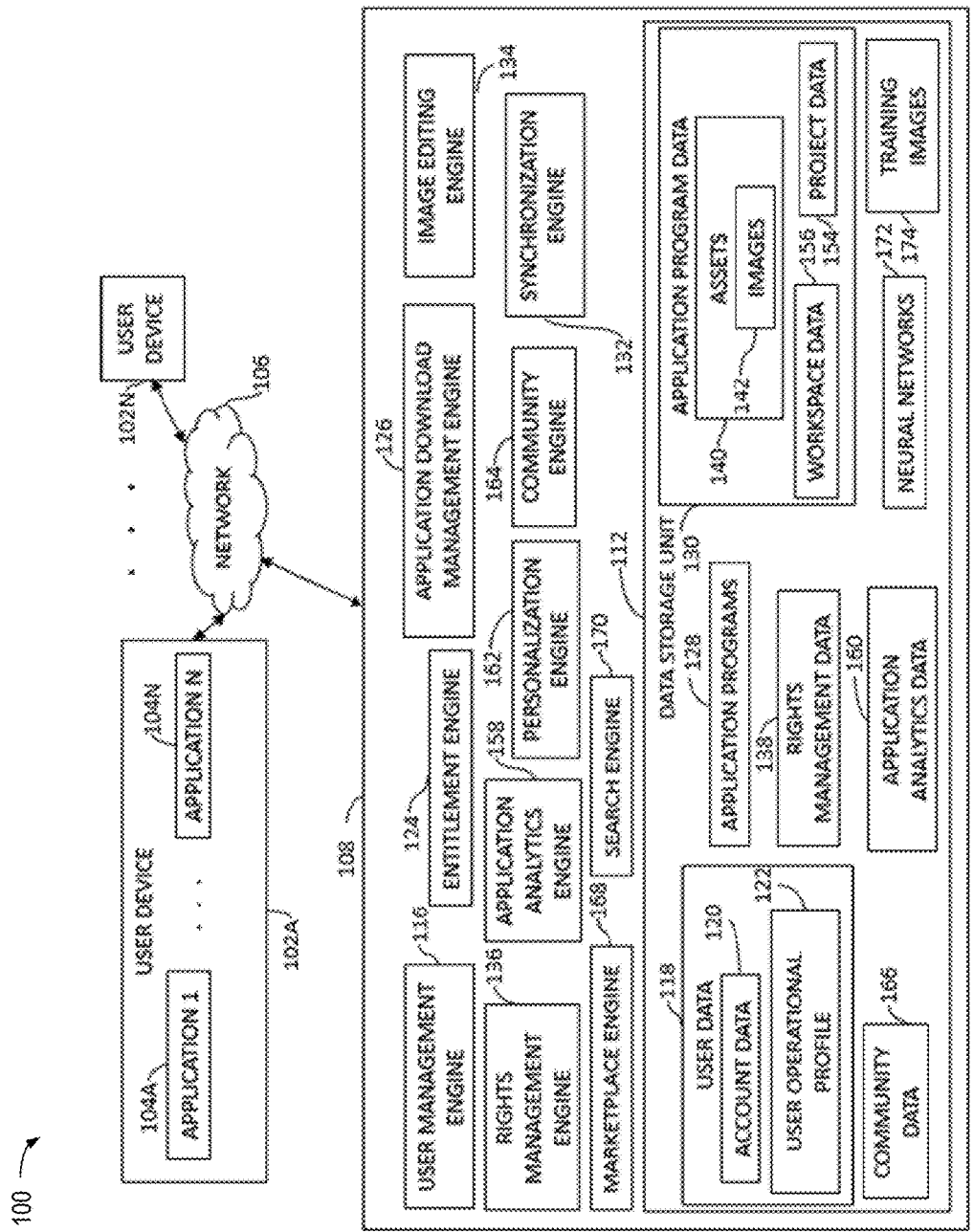
FIG. 1 is a diagram of an environment in which one or more techniques of the invention can be practiced.

As discussed above, existing hole filling techniques do not perform well with respect to filling holes with content that matches the local texture and global structure of the non-hole portions of images. Techniques of the invention use separate neural networks to account for both local texture and global structure in image hole filling. This is achieved using a joint optimization that optimizes both a content constraint that uses a content neural network to account for global structure and a texture constraint that uses a texture neural network to account for local texture. By accounting for both global structure and local texture, the techniques of the invention provide hole filling results that are more realistic than those of prior techniques. The content constraint uses a content neural network that is trained to identify neural network features that represent the global structure of the image and then predict hole fill content based on those global features. The content constraint ensures global structure similarity by enforcing similarity between the content being selected to fill the hole and the prediction of the content neural network. The texture constraint uses a texture neural network trained to identify feature maps that represent texture in image portions. The texture constraint enforces similarity between the texture of the content being selected to fill the hole and the texture in other portions of image. For example, the texture constraint can compare neural network feature maps of patches within the hole with feature maps of patches outside of the hole to ensure texture similarity. The joint optimization uses these constraints to provide more accurate and realistic hole filling results that account for both global structure and local texture.

Embodiments of the invention fill image holes by performing a joint optimization that optimizes a loss function. The loss function uses a content term to enforce the content constraint using the content neural network and a texture term to enforce the texture constraint using the texture neural network. Each of the loss terms is computed using a separate, pre-trained neural network with fixed parameters.

The following example illustrates one way in which separate neural networks can be used to achieve hole filling that accounts for global structure and location texture. In this example, the content neural network is a content encoder-decoder network configured to provide a content predication that matches the global structure of an image. The content neural network is trained to approximate the content for holes in training images in which the actual content of the holes is known. The content neural network is trained to predict content for a hole of an image that is similar to the image with respect to global structure. Specifically, the content neural network is trained to identify high level features of an image that represent the global structure of the image and use those features to predict content to fill the hole of the image. For example, consider an image in which a middle portion of a tree trunk is missing due to a hole in the image. In this example, an upper portion of the tree trunk appears above the hole, a lower portion of the tree trunk appears below the hole, and other tree trunks are depicted elsewhere in the image. The content neural network identifies high-level features of the image that represent the straightness and shape of the tree trunks and uses those features to predict content to fill the hole with content. Specifically, the predicted content includes a middle portion of the tree trunk having straightness and shape similar to the other trees in the image. The middle portion of the tree trunk also aligns at the hole boundaries with the top and bottom tree trunk portions. The predicted content thus matches the global structure of the image.

The content neural network is used as part of a joint optimization hole filling technique that accounts for both global content and local texture. In this example, the content neural network makes an initial hole filling prediction to fill a hole of an image. This initial prediction provides a good prediction of content that matches the global structure of the image. However, the texture of the initial prediction may not match the rest of the image. Accordingly, the joint optimization is used to refine the initial predication that was made using only the content neural network. The joint optimization creates an adjusted prediction for content to fill the hole that accounts for both the global structure and local texture. The joint optimization does so by selecting content to fill the hole using a loss function that has a content term that enforces a content constraint and a texture term that enforces a texture constraint. The content term ensures that the content selected to fill the hole remains similar to that initial prediction that was made by the content neural network. The texture term encourages adjustments to improve texture similarity to the image.

The content term in the loss function penalizes the results of the joint optimization for deviating from the initial prediction of the content neural network. This encourages the results of the joint optimization to preserve the global structure of the image that was captured in that initial prediction. For example, if the content neural network predicts content for the hole that includes a tree trunk portion, the content constraint can penalize content being selected to fill the hole for deviating from this predicted content that has the tree trunk portion. The more the content being selected to fill the hole differs from the initial predicted content of the content neural network, the more it is penalized. Accordingly, the content selected to fill the hole using the joint optimization is encouraged to include content that resembles the tree trunk portion of the initial predicted content from the content neural network result. Since the tree trunk in the predicted content was predicted by the content neural network based on the other tree trunks in the image, the content being selected for the hole is similarly encouraged to have content that resembles tree trunks outside the hole in the image. The tree trunk depicted in the hole will be similar to other trees in the image with respect to straightness and shape. In addition, the content selected for the hole will depict a tree trunk that aligns with upper and lower portions of the tree trunk at the hole boundaries. In this way, the content term ensures global structure consistency by enforcing similarity between the content being selected to fill the hole and the initial prediction of the content neural network.

The texture neural network is a classification network that is also used in the joint optimization. The texture term of the loss function uses the texture neural network to enforce similarity between the texture of the content being selected to fill the hole and the texture in other portions of image. The texture neural network is used to extract features for patches (e.g., 3 pixel×3 pixel regions) in the hole and features of nearby patches outside the hole in the image. The joint optimization uses these extracted features of the patches to encourage each patch in the hole to be similar to a nearby patch outside the hole with respect to texture. In one example, the local texture term of the loss function is the average distance between each patch in the hole and its nearest neighbor patch outside the hole with respect to a predetermined feature layer of the texture neural network, e.g., a layer that encodes mid-level image information that represents texture. These distances represent texture differences between each patch and its nearest neighbor patch outside the hole. The texture term of the loss function penalizes each patch in the hole for differing from its respective nearest neighbor patch. A solid green patch in the hole will be penalized for differing from a nearest neighbor patch outside the hole that depicts the texture of blades of grass. Adjusting the patch to more closely resemble blades of grass will reduce the penalty. Generally, the more similar the texture of a patch inside the hole is to its nearest neighbor outside the hole, the less the penalty. The content selected to fill the hole is thus encouraged by the texture term to be similar to the rest of the image with respect to texture.

The joint optimization determines content for filling a hole that minimizes both the content term and the texture term. In this way, the joint optimization results in selecting content to fill the hole that matches both the global structure and texture of the image.

Various techniques can be used to perform a joint optimization that optimizes a loss function to fill a hole in an image. Certain embodiments of the invention iteratively solve the loss function multiple times, at each iteration using the result image of the prior iteration as input. One embodiment involves solving the optimization by minimizing the joint loss function through gradient backpropagation. In this embodiment, the optimization is initialized with a random input (e.g., a hole filled with a mean value of a collection of natural images to initialize the hole or other solid color) and at each iteration a new prediction is produced and backpropagated to be input into the next iteration. The iterations continue until the predictions satisfies a specified condition. Minimizing the joint loss function in this way is both efficient in terms of processing and storage resources and accurate in terms of results.

Using a joint optimization that uses separate neural network to account for the differing structure and texture aspects of an image in hole filling provides numerous advantages over prior techniques. The joint optimization provides sharper and more realistic hole filling results compared with the output of the content neural network alone. The joint optimization result is also more consistent with global structure as compared with using the texture neural network alone. In addition, in contrast to prior techniques, the techniques disclosed herein can be used to fill holes of arbitrary shapes and sizes.

In one embodiment of the invention, the hole filling results of a joint optimization technique that accounts for global structure and local texture are further improved by applying a patch match technique to add high frequency texture details. The patch match technique does not use a neural network. Rather the patch match technique directly adjusts patches inside a hole based on the pixels in similar patches outside of the hole. Such adjustments can enhance the fine, pixel-level details of the image to further improve the appearance of the hole filling result. In this way, the technique accounts for global structure, local texture, and fine details.

Terminology

As used herein, the phrase "computing device" refers to any electronic component, machine, equipment, or system that can be instructed to carry out operations. Computing devices will typically, but not necessarily, include a processor that is communicatively coupled to a memory and that executes computer-executable program code and/or accesses information stored in memory or other storage.

Examples of computing devices include, but are not limited to, desktop computers, laptop computers, server computers, tablets, telephones, mobile telephones, televisions, portable data assistant (PDA), e-readers, portable game units, smart watches, etc.

As used herein, the phrase "image" refers to a digital, 2D depiction of persons, environment, and/or other objects. An image can be a photo, created content, or a composite of photo and created content. The pixels (i.e., picture elements) of an image identify the appearance of particular portions of the image, for example, with each pixel identifying that a particular area of the image will have a particular color. Pixels are the smallest addressable element to be represented on a display of a computing device. Images are commonly captured using cameras or scanners and stored in memory on a computing device using information that defines the colors of the pixels for the image. The phrase "pixel value" refers to a value that represents the color of a pixel.

As used herein, the phrase "hole" refers to a portion of an image that has unknown, removed, or otherwise missing content. Holes can be created in images by image editing operations performed using photo editing apps. For example, photo editing apps often create holes when a user erases a scene element, adjust an object's position, recovers image content in an occluded image area, etc.

As used herein, the phrase "hole filling," "inpainting" and "image completion" refer to altering an image having a hole to replace with missing content of the hole with content. For example, a hole filling technique can determine pixel values for pixels within the hole and use those pixel values to fill the hole.

As used herein, the phrase "feature" refers to an assessed characteristic of a portion of an image. Embodiments of the invention use neural networks to encode, extract, identify, use, and compare features of images and image portions. For example, a neural network can be used to receive an input and encode features of different portions of the image in one or more neural network layers. These features can then be decoded to predict or hallucinate image portions, e.g., to fill holes, that have those same features. Selecting appropriate features for such an encoding and decoding process can result in hallucinating content for holes of images that have features that match the global features of an image. Thus image features can be used to generate content for hole filling. In another example, image patch features are identified using neural networks for comparison purposes. For example, a neural network can be used to extract image patch features that represent texture of an image. Such patch features can then be used in a comparison, for example, to ensure that the texture of each patch of content that will be used to fill a hole is similar to the texture of at least one of the patches outside of the hole.

As used herein, the phrase "patch" refers to a set of pixels within an image that form a contiguous portion of the image. For example, a patch can include a 2 pixel×2 pixel, 3 pixel ×3 pixel, 4 pixel×4 pixel, 5 pixel×5 pixel, etc. square portion of an image. Patches can have other shapes including, but not limited to, rectangles, lines, triangles, circles, etc. Patches can have various sizes as well from 1 pixel to any number of pixels less than the total number of pixels in the image.

As used herein, the phrase "constraint" refers to a rule, requirement, term, or other aspect of a process used to make a determination that requires or otherwise encourages a specified result. For example, in a loss function, a content constraint can be used to encourage a hole fill result in which the content selected to fill a hole has features that are similar to features extracted from non-hole image portions. Similarly, in a loss function, a texture constraint can be used to encourage a hole fill result in which patches of the content selected to fill a hole have patch features that are similar to patch features of patches of non-hole image portions. A constraint can encourage a result by specifying a penalty for deviating from a specified result, for example, as part of a loss function.

As used herein, the phrase "loss function" refers to a representation that quantifies deviations from one or more requirements or using other constraints. A loss function can include one or more constraints that encourage particular results by each specifying penalties for deviating from respective specified results. Optimizing a loss function can involve determining a result that minimizes the combined loss imposed by the penalties of the one or more constraints.

As used herein, the phrase "mid-level image information" refers to any information about content of an image that is more general than the individual pixel values of the image. Embodiments of the invention use such mid-level information to represent texture of an image. In one example, a neural network is trained for classification to classify objects in an input image as similar to objects in training images. The layers of such a neural network can represent mid-level information about the patches of the image and thus be used to compare similarities of patches with respect to such mid-level information.

As used herein, the phrase "patch match technique" refers to any technique that adjusts patches in an image based on other patches in an image. Generally, patch match techniques compare pixel values of pixels within patches to encourage similar patches within an image. Patch match techniques can make such comparisons at different image resolutions. An exemplary patch match technique is discussed in C. Barnes, E. Shechtman, A. Finkelstein, and D. B. Goldman, "PatchMatch: A randomized correspondence algorithm for structural image editing," TOG, 28(3):24:1-24:11, 2009, incorporated herein by this reference in its entirety.

As used herein, the phrase "content" refers to objects, backgrounds, colors, and other elements of an image represented by the pixels of the image.

As used herein, the phrase "content neural network" refers to any neural network trained to hallucinate or otherwise create content for a hole or other portion of an image based on content in other portions of the image. An exemplary content neural network is a network trained on training images to encode features of an image that has a hole and decode the features to fill the hole with content. Techniques disclosed herein use a content neural network to generate content to fill a hole of an image that is consistent with the global structure of the image.

As used herein, the phrase "global structure" refers to an appearance of an image that results from the shapes and/or relative positions of objects depicted within the image. The global structure of an image can be represented by high level features extracted from the image using an encoder-decoder neural network. Creating content for a hole that is consistent with the global structure of an image can involve creating content that depicts items having shapes that are consistent with the shapes in other portions of the image. Creating content for a hole that is consistent with the global structure of an image can also involve creating content that depicts items that align with items on at the boundaries of the hole.

As used herein, the phrase "texture" refers an appearance of a portion of an image that results from the relationship of pixel values in the portion of an image. For example, the pixels in a portion of an image can have a smooth texture formed by the pixels in the portion of the image having a relatively consistent pixel value. In another example, pixels of a portion of an image may alternate between several two or three colors to form relatively vertical stripes that represent blades of grass. The texture of the portions of an image will have a texture based on the object or objects depicted in that portion. The surface color variations and patterns of objects such as sand, dirt, tree leaves, waves, sky, clouds, fur, cloth, etc. provide pixel relationships in portions of an image that provide texture.

As used herein, the phrase "local texture" refers to texture in nearby portions of an image. Creating content for a hole of an image that accounts for local texture, for example, can involve creating content for the hole that has texture that is similar to the texture in the nearby portions of the image outside of the hole. Specifically, each patch or other area within the hole should have a texture that is similar to at least one patch or other area near the hole.

As used herein, the phrase "texture neural network" refers to any neural network trained to identify, compare, adjust, or use information about an image that represents texture of one or more portions of an image. An example of a texture neural network is a network trained on training images to classify objects within an image based on features of the objects, where the network represents texture of the patches in one or more layers of the neural network.

As used herein, the phrase "high-frequency texture" refers to neural texture at the pixel or neural patch level. A patch match technique, for example, can be used to add high frequency texture to portions of an image that lack high frequency texture by replacing the pixels of a patch with pixels of a similar patch from the image.

Exemplary Image Creation, Editing, and Distribution Environment

FIG. 1 is a diagram of an environment 100 in which one or more embodiments of the present disclosure can be practiced. The environment 100 includes one or more user devices, such as a user device 102A up to a user device 102N. Each of the user devices is connected to a creative apparatus 108 via a network 106. Users of the user devices uses various products, applications, or services supported by the creative apparatus 108 via the network 106. The user devices correspond to various users. Examples of the users include, but are not limited to, creative professionals or hobbyists who use creative tools to generate, edit, track, or manage creative content, end users, administrators, developers, content owners, content managers, content creators, content viewers, content consumers, designers, editors, any combination of these users, or any other user who uses digital tools to create, view, edit, track, or manage digital experiences.

A digital tool, as described herein, includes a tool that is used for performing a function or a workflow electronically. Examples of a digital tool include, but are not limited to, a content creation tool, a content editing tool, a content publishing tool, a content tracking tool, a content managing tool, a content printing tool, a content consumption tool, any combination of these tools, or any other tool that can be used for creating, editing, managing, generating, tracking, consuming or performing any other function or workflow related to content. Digital tools include the creative apparatus 108.

A digital experience, as described herein, includes an experience that can be consumed through an electronic device. Examples of a digital experience include content creating, content editing, content tracking, content publishing, content posting, content printing, content managing, content viewing, content consuming, any combination of these experiences, or any other workflow or function that can be performed related to content.

Content, as described herein, includes electronic content. Examples of the content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

Examples of the user devices 102A-N include, but are not limited to, a personal computer (PC), tablet computer, a desktop computer, a processing unit, any combination of these devices, or any other suitable device having one or more processors. Each user device includes at least one application supported by the creative apparatus 108.

It is to be appreciated that following description is now explained using the user device 102A as an example and any other user device can be used.

Examples of the network 106 include, but are not limited to, internet, local area network (LAN), wireless area network, wired area network, wide area network, and the like.

The creative apparatus 108 includes one or more engines for providing one or more digital experiences to the user. The creative apparatus 108 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. The creative apparatus 108 also includes a data storage unit 112. The data storage unit 112 can be implemented as one or more databases or one or more data servers. The data storage unit 112 includes data that is used by the engines of the creative apparatus 108.

A user of the user device 102A visits a webpage or an application store to explore applications supported by the creative apparatus 108. The creative apparatus 108 provides the applications as a software as a service (SaaS), or as a standalone application that can be installed on the user device 102A, or as a combination. The user creates an account with the creative apparatus 108 by providing user details and also by creating login details. Alternatively, the creative apparatus 108 can automatically create login details for the user in response to receipt of the user details. In some embodiments, the user is also prompted to install an application manager. The application manager enables the user to manage installation of various applications supported by the creative apparatus 108 and also to manage other functionalities, such as updates, subscription account and the like, associated with the applications. The user details are received by a user management engine 116 and stored as user data 118 in the data storage unit 112. In some embodiments, the user data 118 further includes account data 120 under which the user details are stored.

The user can either opt for a trial account or can make payment based on type of account or subscription chosen by the user. Alternatively, the payment can be based on product or number of products chosen by the user. Based on payment details of the user, a user operational profile 122 is generated by an entitlement engine 124. The user operational profile 122 is stored in the data storage unit 112 and indicates entitlement of the user to various products or services. The user operational profile 122 also indicates type of user, i.e. free, trial, student, discounted, or paid.

The user management engine 116 and the entitlement engine 124 can be one single engine performing the functionalities of both the engines.

The user then installs various applications supported by the creative apparatus 108 via an application download management engine 126. Application installers or application programs 128 present in the data storage unit 112 are fetched by the application download management engine 126 and made available to the user directly or via the application manager. In one embodiment, all application programs 128 are fetched and provided to the user via an interface of the application manager. In another embodiment, application programs 128 for which the user is eligible based on user's operational profile are displayed to the user. The user then selects the application programs 128 or the applications that the user wants to download. The application programs 128 are then downloaded on the user device 102A by the application manager via the application download management engine 126. Corresponding data regarding the download is also updated in the user operational profile 122. An application program 128 is an example of the digital tool. The application download management engine 126 also manages process of providing updates to the user device 102A.

Upon download, installation and launching of an application program, in one embodiment, the user is asked to provide the login details. A check is again made by the user management engine 116 and the entitlement engine 124 to ensure that the user is entitled to use the application program. In another embodiment, direct access is provided to the application program as the user is already logged into the application manager.

The user uses one or more application programs 128 to create one or more projects or assets. In addition, the user also has a workspace within each application program. The workspace, as described herein, includes setting of the application program, setting of tools or setting of user interface provided by the application program, and any other setting or properties specific to the application program. Each user has a workspace. The workspace, the projects, and/or the assets are then stored as application program data 130 in the data storage unit 112 by a synchronization engine 132. The application program data 130 can be specific to the user or can be shared with other users based on rights management. The rights management is performed by a rights management engine 136. Rights management rules or criteria are stored as rights management data 138 in the data storage unit 112.

The application program data 130 includes one or more assets 140. The assets 140 can be a shared asset which the user wants to share with other users or which the user wants to offer on a marketplace. The assets 140 can also be shared across multiple application programs 128. Embodiments of the invention that fill holes in images can store images 142 as part of the assets 140. For example, a user can upload a portfolio of images 142 and use applications 104A-N and/or image editing engine 134 to edit one or more of the images 142. The applications 104A-N and/or the image editing engine 134 can use neural network 172, which are trained using training images 174.

The application program data 130 also includes project data 154 and workspace data 156. In one embodiment, the project data 154 includes the assets 140. In another embodiment, the assets 140 are standalone assets. Similarly, the workspace data 156 can be part of the project data 154 in one embodiment, while it may be standalone data in other embodiments.

The user can have one or more user devices. The application program data 130 is accessible by the user from any device, i.e. including the device that was not used to create the assets 140. This is achieved by the synchronization engine 132 that stores the application program data 130 in the data storage unit 112 and makes the application program data 130 available for access by the user or other users via any device. Before accessing the application program data 130 by the user from any other device or by any other user, the user or the other user may need to provide login details for authentication if not already logged in. Else, if the user or the other user are logged in then a newly created asset or updates to the application program data 130 are provided in real time. The rights management engine 136 is also called to determine whether the newly created asset or the updates can be provided to the other user or not. The workspace data 156 enables the synchronization engine 132 to provide same workspace configuration to the user on any other device or to the other user based on the rights management data 138.

In some embodiments, the user interaction with the application programs 128 is also tracked by an application analytics engine 158 and stored as application analytics data 160. The application analytics data 160 includes, for example, usage of a tool, usage of a feature, usage of a workflow, usage of the assets 140, and the like. The application analytics data 160 can include the usage data on a per user basis and can also include the usage data on a per tool basis or per feature basis or per workflow basis or any other basis. For example, the application analytics data 160 may track usage of an image editing engine 134. The application analytics engine 158 embeds a piece of code in the application programs 128 that enables an application program to collect the usage data and send it to the application analytics engine 158. The application analytics engine 158 stores the usage data as the application analytics data 160 and processes the application analytics data 160 to draw meaningful output. For example, the application analytics engine 158 can draw an output that the user uses "Tool 4" a particular number of times. The output of the application analytics engine 158 is used by a personalization engine 162 to personalize tool menu for the user to show "Tool 4" on top. Other types of personalization can also be performed based on the application analytics data 158. In addition, the personalization engine 162 can also use the workspace data 156 or the user data 118 including user preferences to personalize one or more application programs 128 for the user.

The creative apparatus 108 also includes a community engine 164 which enables creation of various communities and collaboration among the communities. A community, as described herein, includes a group of users that share at least one common interest. The community can be closed, i.e. limited to a number of users or can be open, i.e. anyone can participate. The community enables the users to share each other's work and comment or like each other's work. The work includes the application program data 140. The community engine 164 stores any data corresponding to the community, such as work shared on the community and comments or likes received for the work as community data 166. The community data 166 also includes notification data and is used for notifying other users by the community engine in case of any activity related to the work or new work being shared. The community engine 164 works in conjunction with the synchronization engine 132 to provide collaborative workflows to the user.

The creative apparatus 108 also includes a marketplace engine 168 for providing a marketplace to one or more users.

The marketplace engine 168 enables the user to offer an asset for sale or use. The marketplace engine 168 has access to the assets 140 that the user wants to offer on the marketplace. The creative apparatus 108 also includes a search engine 170 to enable searching of the assets 140 in the marketplace. The search engine 170 is also a part of one or more application programs 128 to enable the user to perform search for the assets 140 or any other type of the application program data 130. The search engine 170 can perform a search for an asset using the metadata 142 or the file.

It is to be appreciated that the engines and working of the engines are described as examples herein and the engines can be used for performing any step in providing digital experience to the user.

Exemplary Hole Filling Techniques

Embodiments of the invention provide techniques, systems, and computer-readable mediums with stored instructions that enable image hole filling that accounts for global structure and local texture.

Figure 2:
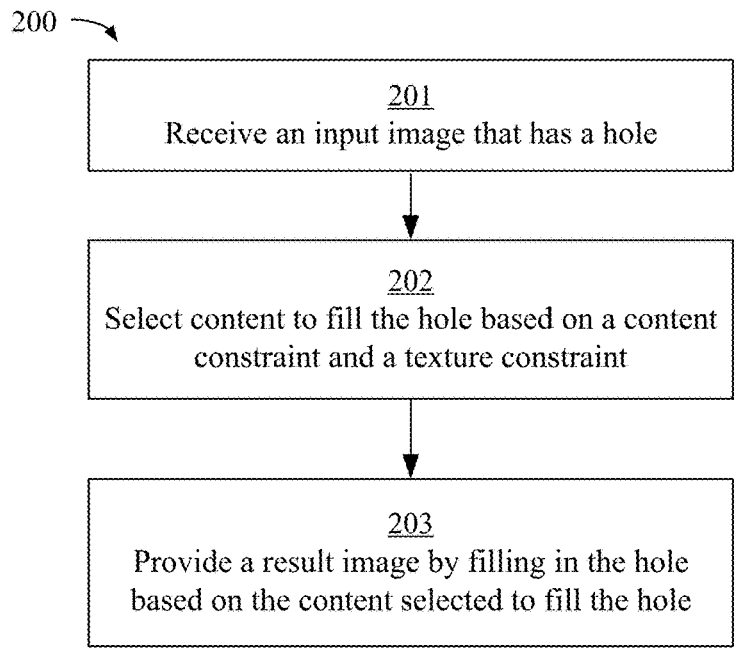
FIG. 2 is flow chart illustrating an exemplary technique for hole filling that accounts for global structure and local texture.

FIG. 2 is flow chart illustrating an exemplary technique 200 for hole filling that accounts for global structure and local texture. The exemplary technique 200 performs various functions to achieve more accurate hole filling than prior techniques. The technique 200 generally involves receiving an input image that has a hole, as shown in block 201, selecting content to fill the hole based on a content constraint and a texture constraint, as shown in block 202, providing a result image by filling in the hole based on the content selected to fill the hole, as shown in block 203. These functions are generally implemented on one or more computing devices that use one or more processors to execute algorithms of one or more operations defined in stored instructions. For example, the image editing engine 134 of FIG. 1 could perform these functions. The operations of various exemplary algorithms that can be employed to perform these functions are discussed in the FIGURES and throughout this specification.

The function of receiving an input image that has a hole shown in block 201 can be performed using one or more computing devices implementing various algorithms by executing stored instructions. The algorithms can include any of the exemplary techniques disclosed herein as well as modifications to the techniques herein to address particular circumstances of an implementation. In one non-limiting example, the image is received based user input provided on a user interface. For example, a user may use a user interface to identify an image for hole filling. The image, if not already locally, available can be retrieved from a storage device, network storage location, or any other location. The user interface can automatically identify one or more holes of the image to be filled or can receive user input to identify which portions of the image should be treated as holes.

The function of selecting content to fill the hole based on a content constraint and a texture constraint shown in block 202 can be performed using one or more computing devices implementing various algorithms by executing stored instructions. The algorithms can include any of the exemplary techniques disclosed herein as well as modifications to the techniques herein to address particular circumstances of an implementation. In one non-limiting example, selecting content to fill the hole involves applying a content constraint that uses the content neural network and a texture constraint that uses a texture neural network. Selecting content according to the content constraint can involve selecting content that is consistent with a global structure of the image using a content neural network. The content neural network identifies the global structure of the image, for example, by producing an initial prediction of content to fill the hole. The content constraint can ensure that the content selected to fill the hole is similar to this initial prediction to ensure that the content will be consistent with the global structure of the image. Selecting the content according to the texture constraint can involve selecting content with texture similar to the texture of the image outside the hole using a texture neural network. The texture neural network identifies image features that are used to assess texture similarity. For example, the texture constraint can ensure that patches inside the hole have a texture that is similar to at least one patch outside of the hole by comparing the textures of the patch using the texture neural network.

Selecting pixels according to such constraints can involve optimizing a loss function (i.e., a joint optimization) that penalizes deviations from global structure based on the content neural network and that penalizes deviations with respect to local texture using the texture neural network. Such a loss function can be optimized using various techniques. One embodiment of the invention uses an iterative approach, such as a backpropagation technique, to solve the joint optimization.

The function of providing a result image by filling in the hole based on the content selected to fill the hole shown in block 203 can be performed using one or more computing devices implementing various algorithms by executing stored instructions. The algorithms can include any of the exemplary techniques disclosed herein as well as modifications to the techniques herein to address particular circumstances of an implementation. In one non-limiting example, providing the result image by filling in the hole comprises generating a new image with pixel values in the hole region replacing the pixel values in the hole region in the original image.

Figure 3:
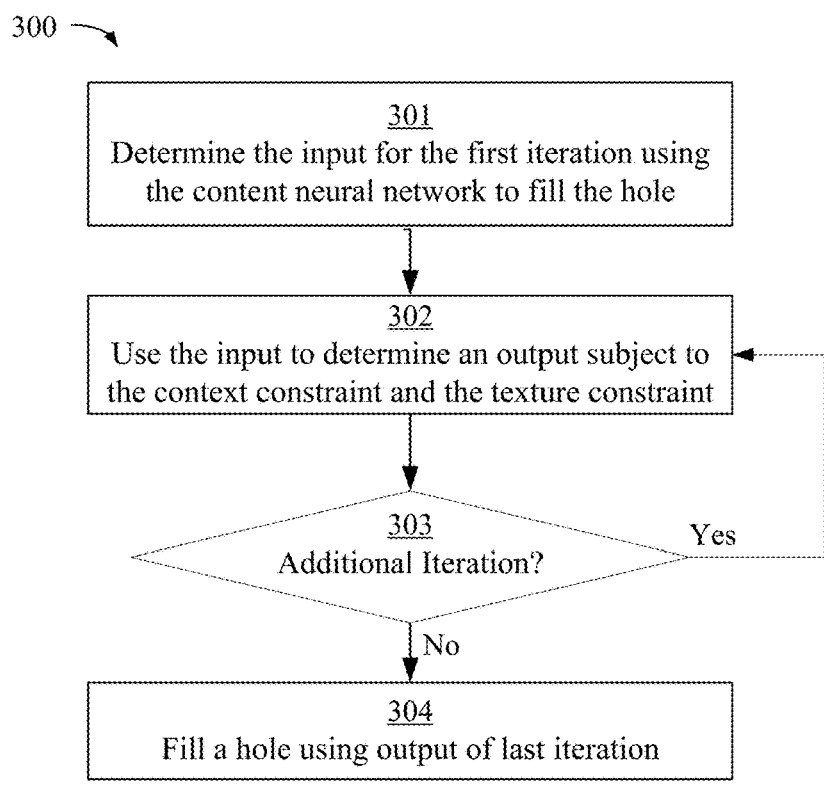
FIG. 3 is a flow chart illustrating an exemplary technique for hole filling by iteratively solving a loss function using an output from each iteration as an input for a next iteration.

FIG. 3 is a flow chart illustrating an exemplary technique 300 for hole filling by iteratively solving a loss function using an output from each iteration as an input for a next iteration. The technique 300 can be implemented on one or more computing devices that use one or more processors to execute algorithms of one or more operations defined in stored instructions. For example, the image editing engine 134 of FIG. 1 could perform these functions.

The technique 300 involves determining the input for the first iteration using the content neural network to fill the hole, as shown in block 301. In block 302, the technique 300 uses an input (i.e., an image with the hole filled in) to determine an output (i.e., an altered image with the hole filed in) using the content neural network and the texture constraint. In the first iteration the input image of block 302 is the image with content for the hole determined in block 301. In subsequent iterations, the input for block 302 can come from the output of prior iterations. Thus in decision block 303, the technique 300 determines whether to perform additional iterations or not. If an additional iteration is to be performed, the technique returns to block 302 to use the output from the prior iteration as input in the current iteration. If an additional iteration is not determined in block 303, the technique 300 proceeds to block 304 to fill the hole of the image using the output of the last iteration. In one embodiment of the invention, the number of iterations is predetermined. In another embodiment of the invention, an estimation technique is used to determine that the difference between the result image and the ground truth x is sufficiently small to stop iterating. For example, iterations can continue until the combined loss is below a threshold or until the incremental combined loss reduction between iterations drops below a threshold.

Exemplary Computational Framework for Hole Filling

Embodiments of the invention use an algorithm that attempts to find a completed image x̃ that optimizes a loss function. The loss is formulated as a combination of two terms: a content term that encourages the output image to have consistent global structure and a texture term that encourages the output to have textural properties similar to those in the regions outside the hole. Each loss term is computed using a pre-trained neural network with fixed parameters.

Figure 4:
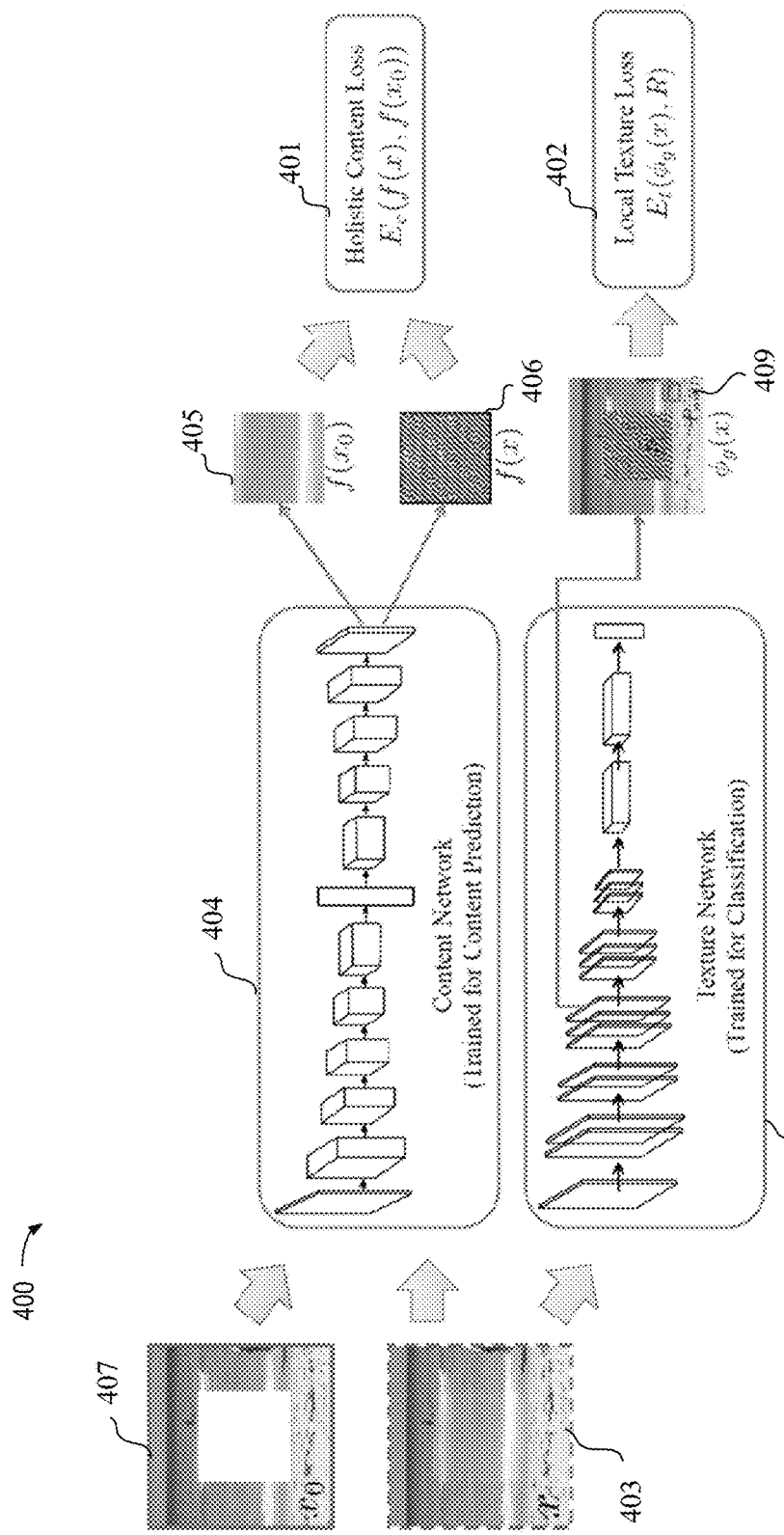
FIG. 4 is a graphical depiction of a technique for solving a joint loss function that includes both a content term and a texture term that use neural networks.

FIG. 4 is a graphical depiction of a technique 400 for solving a joint loss function that includes both a content term and a texture term that use neural networks. The technique 400 solves for the unknown image (x̃) using the content loss ($E_c$) 401 and the texture loss ($E_t$) 402. The content loss ($E_c$) 401 is derived by feeding the image (x) 403 into a pre-trained content neural network f 404 and comparing the output (f(x)) 405 with the reference content prediction (f($x_0$)) 406. The reference content prediction (f($x_0$)) 406 is determined using the initial input image $x_0$ 407. The texture loss ($E_t$) 402 is derived by feeding x 403 into a pre-trained texture neural network g 408 and comparing local neural patches on its feature maps, as graphically depicted in image 409 (see FIG. 6). The following discussion explains these exemplary processes in greater detail.

To model the content loss ($E_c$) 401, the technique 400 first trains the content neural network f 404 using an image $x_0$ with a mean color filled in the hole as the input, and the ground truth image $x_g$ with the original hole content as the supervision. The content neural network f 404 can be trained on a single dataset or using a number of different datasets.

Once the content neural network f 404 is trained, the response of the network f($x_0$) is used as a content reference for a joint optimization. More specifically, the response of the network f($x_0$) provides a prediction of content for the hole based on the input image $x_0$. The technique 400 uses this prediction to compare later predictions made using the content neural network f 404 and texture neural network g 408 to ensure that the later predictions do not deviate too significantly from the initial prediction f($x_0$). For example, content loss ($E_c$) 401 can be formulated to penalize deviations from the initial prediction f($x_0$) so that predictions made in later iterations of an iterative process are penalized for deviating from the initial prediction f($x_0$).

The goal of the texture loss ($E_t$) 402 is to ensure that the image content in the hole is "similar" locally to that of its surrounding. "Similarity" here refers to similarity of neural patches, which encode mid-level image information. To compute this, the technique 400 feeds the image x 403 into a pre-trained texture neural network g 408 (such as the Visual Geometry Group ("VGG") network) and uses the constraint to enforce that the response of small (e.g., 3 pixel×3 pixel) neural patches inside the hole is similar to neural patches outside the hole at a pre-determined feature layer of the network g 408. One embodiment of the invention uses the ReLU31 layer of the VGG network, which provides a desirable balance between low and high level features for certain implementations.

In embodiments of the invention, the content neural network f 404 is based on a content encoder-decoder network, and is accurate for structured content prediction, while the texture neural network g 408 is a classification network, which encourages patches that are semantically similar, but can be visibly different due to variance in photometric and geometric distortion.

The technique 400 iteratively updates x by minimizing the joint loss through gradient backpropagation on the two convolutional networks. In one embodiment of the invention, the parameters of the content neural network and the texture neural network are fixed and only the image x is updated by alternating forward and backward CNN propagation passes. The following paragraphs provide additional examples and features of exemplary loss constraints, loss functions, and optimizations.

The Joint Loss Function

The following provides an example of a joint loss function that can be used for hole filling. In this example, R denotes a hole in the image x, and R' denotes the corresponding region in a feature map $\phi(x)$ of a convolutional neural network. In this example, h defines the operation of extracting a sub-image or sub-feature-map in a rectangular region, i.e. h(x;R) returns the content of x within R, and h($\phi$)(x); R') returns the content of $\phi(x)$ within R', respectively. Given an input image x, the content neural network f is represented by function f(x) and the texture neural network g is represented by function g(x).

The optimal reconstruction (hole filling) result $\tilde{x}$ is obtained by solving the following minimization problem (Equation 1):

$$\tilde{x} = \mathrm{argmin}_x E_c(f(x), f(x_0)) + \alpha E_t(\phi_g(x), R),$$

where $\phi_g(\bullet)$ represents a feature map at an intermediate layer in the texture neural network g, and α is a weight reflecting the importance between the two terms. For simplicity of notation, the parameters of the two networks f and g are omitted as those parameters are fixed during this optimization. Note that it is also possible to use the feature maps $\phi_f(\bullet)$ to measure the content loss $E_c$. However, using the output layer in f, as in this example, can produce better results in certain implementations.

In Equation 1, the content loss $E_c$ penalizes the forward prediction f(x) of the image x based on its deviation from f($x_0$) using Equation 2:

$$E_c(f(x), f(x_0)) = \|f(x) - f(x_0)\|_2^2$$

The texture loss $E_t$ in Equation 1 penalizes the discrepancy of the appearance of texture patterns inside and outside the hole. To measure the texture consistency, a certain feature layer in the network g is chosen, and its feature map $\phi_g$ is extracted. For each local query patch P of size s×s×c (where s×s is the spatial grid and c is the channel) in the hole R' and its most similar patch outside the hole is found, and the loss is computed by averaging the distances of the query patch and its nearest neighbor using Equation 3:

$$E_t(\phi_g(x), R) = \frac{1}{|R'|} \sum_{l \in R'} \|h(\phi_g(x), P_l) - h(\phi_g(x), P_{nn(l)})\|_2^2$$

where R' is the region in $\phi_g(x)$ corresponding to the hole R in the original image x, |R'| is the number of patches sampled in the region R', $P_l$ is the local patch centered at location l, and nn(l) is computed using Equation 4:

$$nn(l) = \mathrm{argmin}_{j \in N(l) \wedge j \notin R'} \|h(\phi_g(x), P_l) - h(\phi_g(x), P_j)\|_2^2$$

where N(l) is the set of neighboring locations of l excluding the overlap with R'. Equation 4 thus identifies the nearest neighbor patch with respect to the feature vector and Equation 3 is determining the distance between nearest neighbors, e.g., the distance between each patch in the hole and its nearest neighbor with respect to the feature vector. The nearest neighbor nn(l) can be computed as a layer in a CNN. In Equation 4, the nearest neighbor within a local neighborhood is determined based on the N(l) constraint. In other words, the nearest neighbor that is local but not within the hole is identified.

Content Neural Network

The content neural network f can be trained in various ways. One exemplary technique for training the content neural network f involves training a regression network to make the response f($x_0$) of an input image $x_0$ (with the unknown region) approximate the ground truth $x_g$ at region R. Such a training technique can use a loss function that uses L2-loss, SSIM loss, L1-loss, perceptual loss, and/or adversarial loss. One embodiment of the invention uses the L2-loss within the unknown region R to produce the desired structure, e.g., providing global content similarity and/or hole boundary alignment.

For each training image, the loss is defined using Equation 5 as:

$$L(x, x_g, R) = \|f(x) - h(x_g, R)\|_2^2$$

In this example, R is set to be a square region and its location is fixed. The network input is scaled and the network output is restricted to predict only the hole R. In an alternative embodiment of the invention, the locations of holes are randomized and a larger training dataset is used to allow the network to both localize the hole and predict the content in the hole during training. To reduce the size of the dataset, R can be set to be at the center of the input training image. Note that despite this assumption during training, the network is still able to predict the content for arbitrary holes in images. The training technique can also initialize the hole pixels as a constant mean color. Starting with a constant mean color can improve the accuracy of the training technique.

Use of the content neural network in a joint optimization for hole filling can provide content for the hole boundaries that is consistent with the global structure of other portions of the image. In addition, use of the content neural network can help improve the appearance around the hole boundaries.

Figure 5:
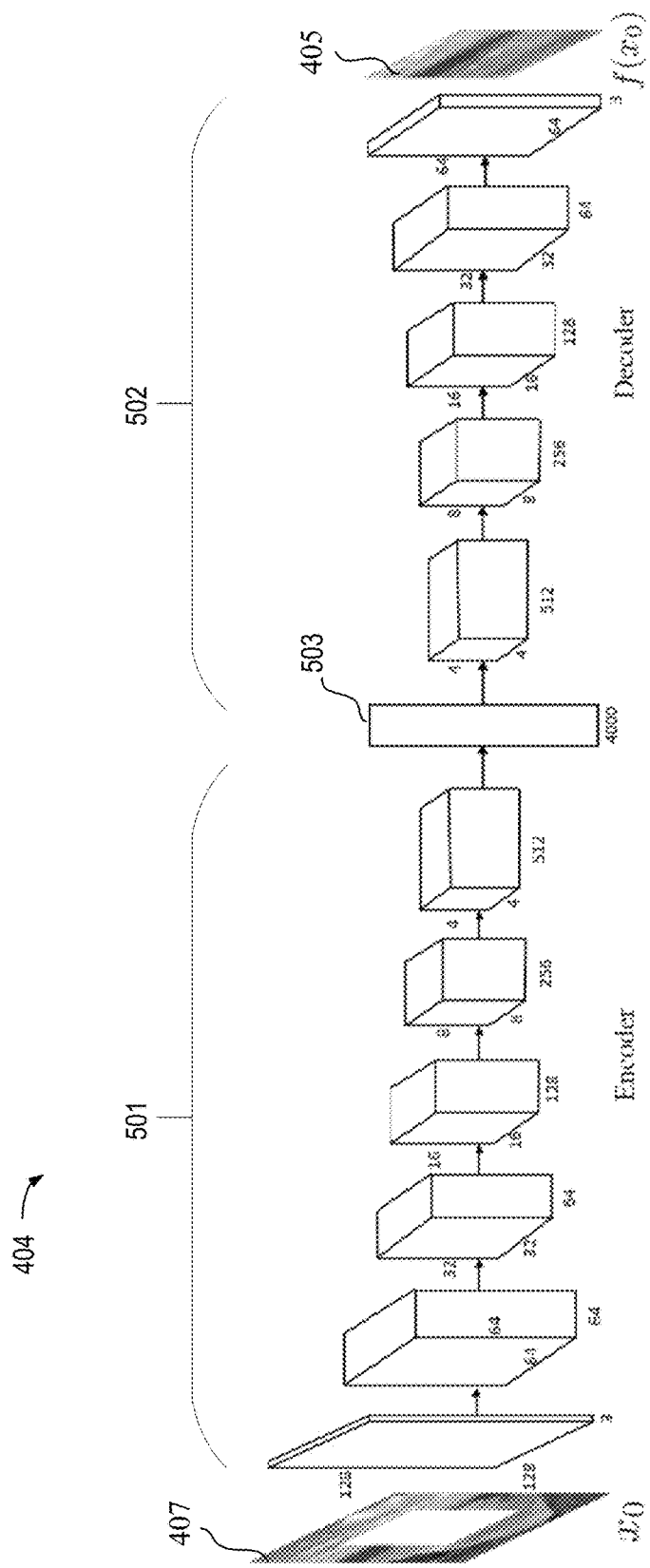
FIG. 5 illustrates a graphical depiction of exemplary layers of a content neural network having an encoder/decoder format.

FIG. 5 illustrates graphical depiction of exemplary layers of a content neural network 404 having an encoder/decoder format. In this exemplary network 404, a first set of layers 501 is trained to encode image features and a second set of layers 502 is trained to decode the image features to produce image content. For example, the network 404 can receive an input image $x_0$ 407, use the encoder layers 501 to encode features 503, and use the decoder layers 502 to decode the features 503 to produce a result f($x_0$) 405.

Embodiment of the invention uses L2 loss architecture. Using the ELU layers can be advantageous over using ReLU/leaky-ReLU layers to reduce network loss that can occur after several iterations and the consequent inaccurate training. The ELU unit can make the regression network training more stable than the ReLU leaky layers as it can handle large negative responses during the training process. In additional, it can be advantageous to use the standard fully-connected layer instead of the channel-wise fully connected layer since it may be unnecessary to compress the network size. For example, the network size may be sufficiently small enough to be run within the limits of CPU memory, in contrast to an adversarial loss-based approach that would likely take significantly more memory input.

Texture Neural Network

The goal of the texture loss ($E_t$) is to ensure that the image content in the hole is "similar" locally to that of its surrounding. To compute this, the image x 403 is input into a pre-trained network (such as the Visual Geometry Group ("VGG") network). The texture loss ($E_t$) enforces that the response of small (e.g., 3 pixel×3 pixel) neural patches inside the hole are similar to neural patches outside the hole at a pre-determined feature layer of the network.

Figure 6:
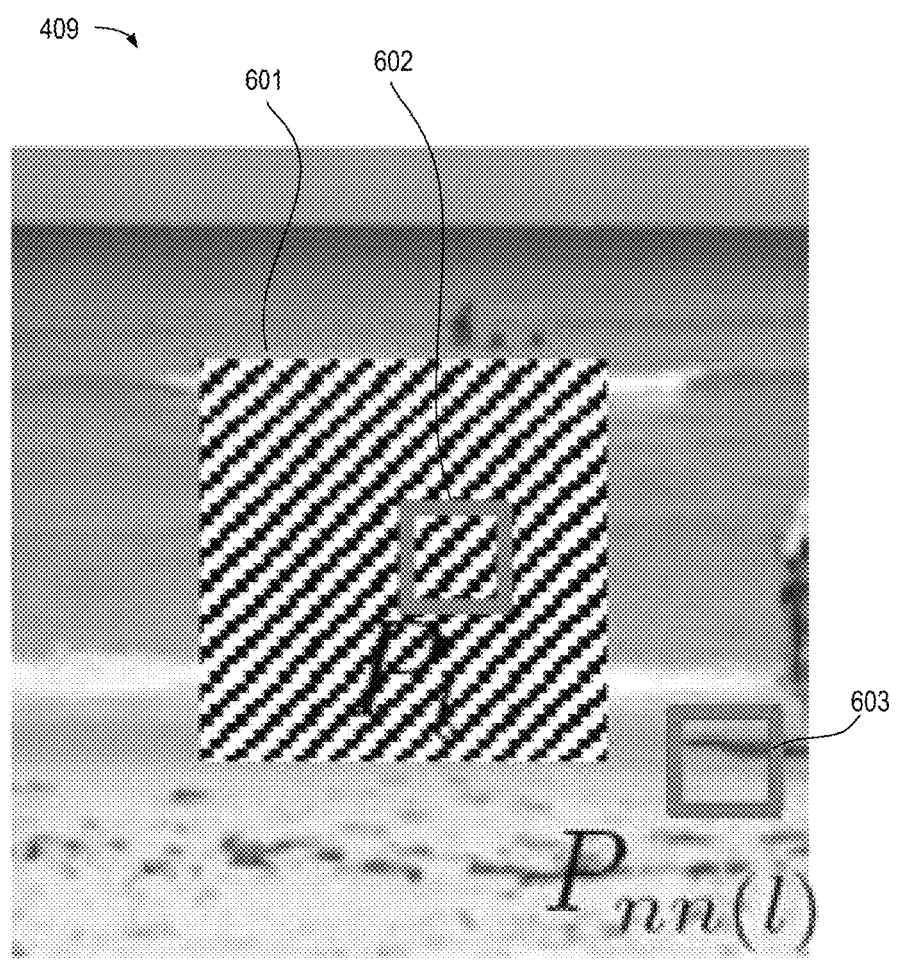
FIG. 6 is a graphical depiction of a patch comparison that uses a texture neural network.

FIG. 6 is a graphical depiction of a patch comparison that uses the texture neural network. In this example, the texture neural network g identifies features of patches in an image 409. For examples a features of a potential patch 602 within a hole 601 are compared with features of patches outside the hole, such as patch 603. For each patch in the hole 601, the technique finds a most similar patch in a local region outside of the hole. The feature difference of each patch with respect to its nearest neighbor patch are compared and deviations are penalized. In this way, each patch within the hole 601 is encouraged to have features similar to at least one local patch outside of the hole 601.

One embodiment of the invention uses the VGG16 network pre-trained for ImageNet classification as the texture neural network, and uses its ReLU31 layer and the RGB layer (input image layer) to calculate the texture term. This can make the optimization faster and slightly more accurate than only using ReLU31. By training a classification network, the network layers are more specific for particular classes of objects. The features that are used to make the texture predictions are based on classification specific training images and thus will likely be more precise and provide more accurate results.

In an alternative embodiment, the VGG16 network can be fine-tuned for in-place regression to predict the ground truth image $x_g$. However, such a fine-tuned network may not improve the final hole filling results compared to a pre-trained one.

In another alternative embodiment, the content neural network f can be used as the texture neural network g. However, the accuracy of this alternative may be less than that of a technique that uses a pretrained VGG. For example, since the VGG network has been trained for semantic classification, neurons/features of its intermediate layers manifest strong invariance on texture distortions on the same semantic regions. This helps infer more accurate reconstruction of the hole content under expected deformations.

Optimization

A joint optimization that uses both a content constraint and a texture constraint can be solved using various techniques. Certain embodiments of the invention solve such a joint optimization by solving a joint loss minimization problem by iterative gradient backpropagation with Limited-Memory BFGS. In this implementation, $f(x_0)$ is computed by forward propagating the image $x_0$ with mean-filled initialization of the hole R. After that, $f(x_0)$ is used to initialize x (i.e., $x_1=f(x_0)$) and also as the content reference to evaluate $E_c$ in each iteration of the optimization process. In one implementation, the content reference is fixed to $f(x_0)$. However, in alternative implementations, the content reference can vary with the forward propagation result of each iteration, i.e., $f(x_t)$; t=1, 2, 3 . . .

Each iteration involves a forward propagation of both the content neural network f and the texture neural network g to compute the loss, and a backward propagation to compute the gradient with respect to the image pixels. For the texture constraint $E_t$, the gradient update is averaged on overlapping pixels between patches. Thus, if each patch is 5 pixels×5 pixels and the patches overlap, each pixel is computed up to 25 times for up to 25 different partially overlapping patches. The gradient is averaged using these 25 values to ensure its correctness. The technique can further involve putting a slightly larger weight on patches around the hole border to ensure smooth appearance transitions around the hole boundaries.

Using a joint optimization to provide hole filling that accounts for a content constraint $E_c$ and a texture constraint $E_t$ provides numerous benefits over prior techniques.

Figure 7:
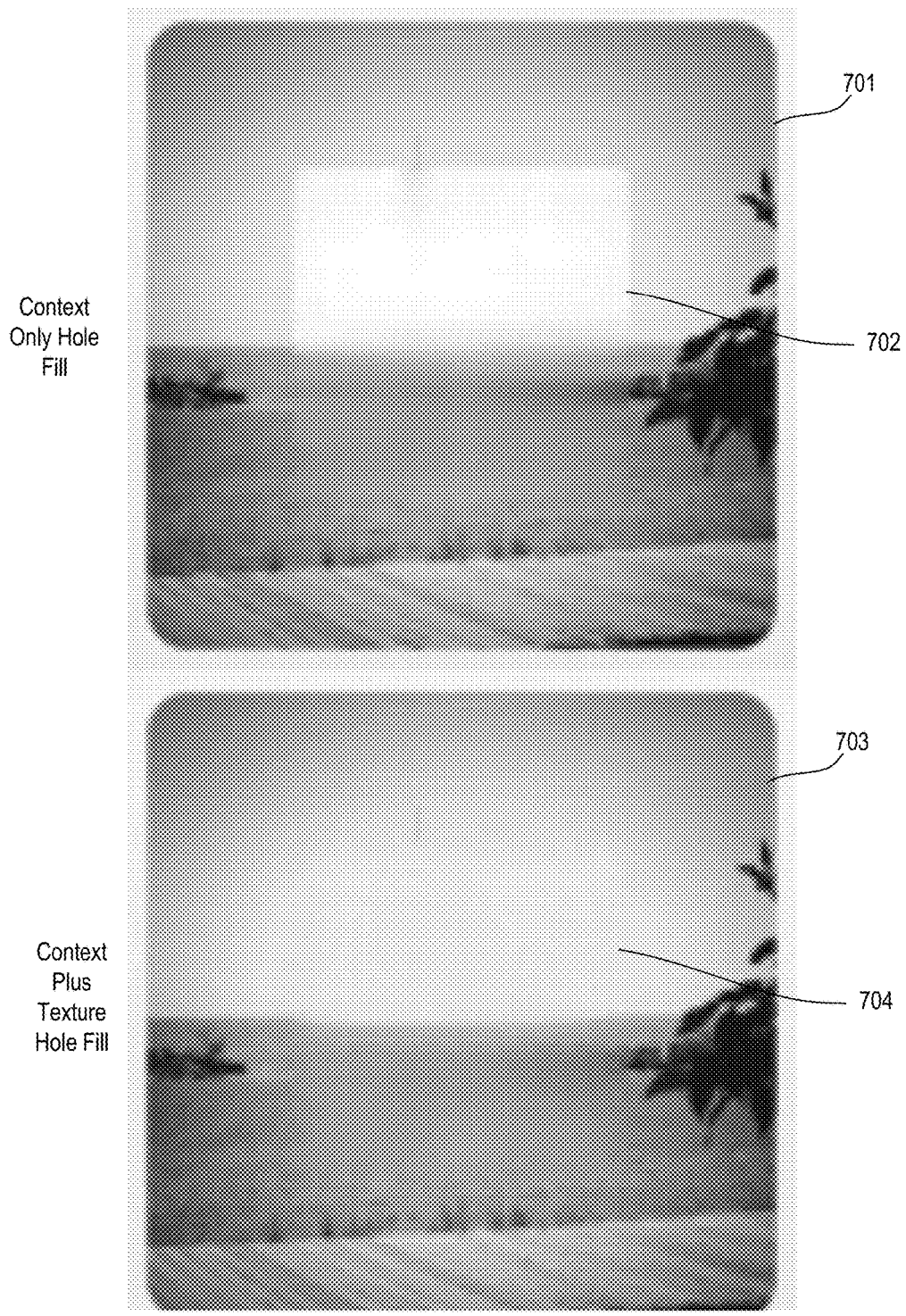
FIG. 7 is a graphical depiction comparing an image produced using a content only hole filling technique and an image produced using a content plus texture hole filling technique.

FIG. 7 is a graphical depiction comparing an image 701 produced using a content only hole filling technique and an image 703 produced using a content plus texture hole filling technique using an embodiment of the invention. FIG. 7 shows that the content plus texture hole filling technique produces an image 704 that has better texture as well as smoother transitions. For example, the texture of the ground within the hole 704 is more similar to the texture of the nearby ground in the non-hole portion of image 703 than the texture of the ground within the hole 702 is to the nearby ground in the non-hole portion of image 701. In addition, the transition between the border area 704 in image 703 is less abrupt and noticeable than the transition at the border area around filled hole 702 in image 701.

Figure 8:
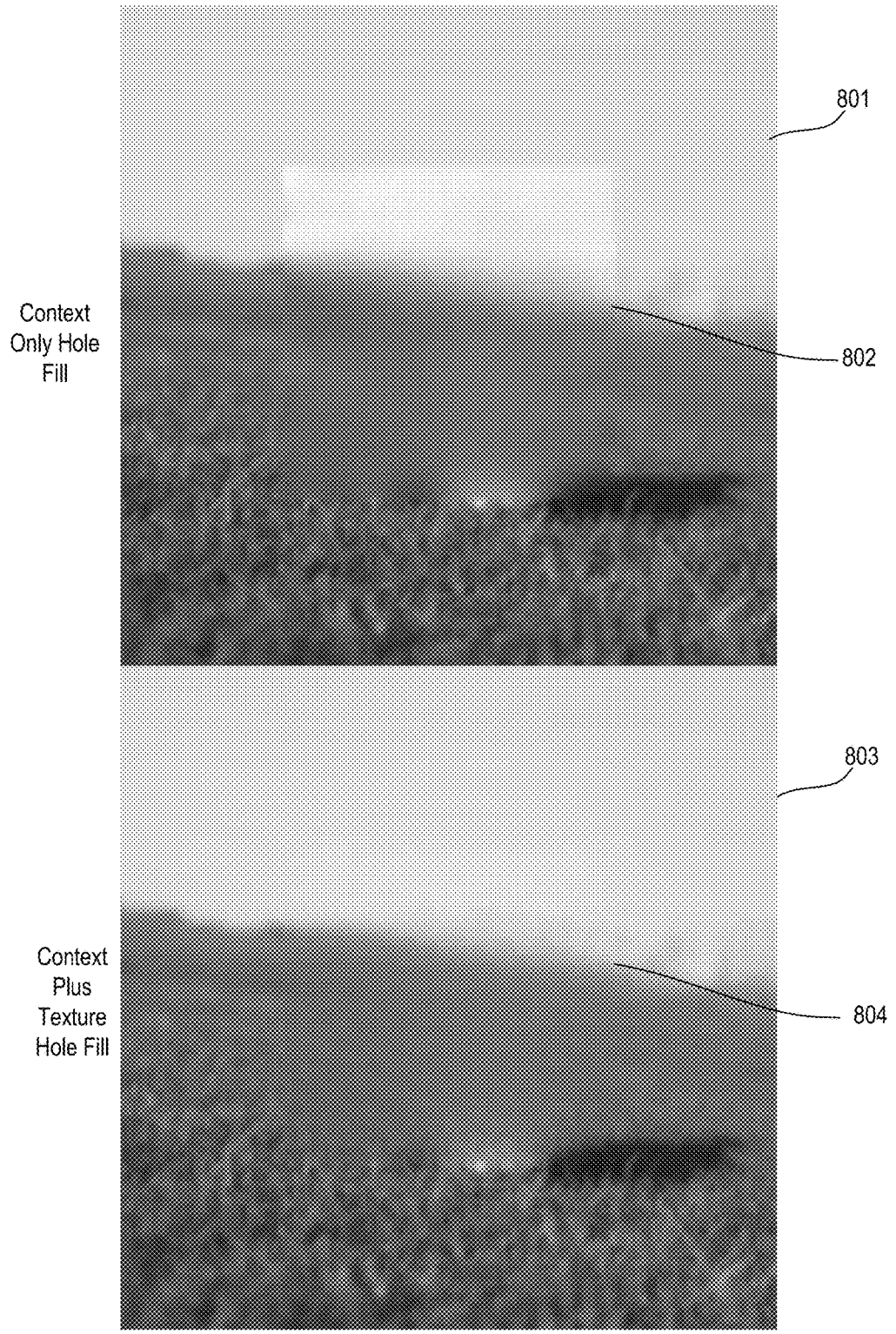
FIG. 8 is another graphical depiction comparing an image produced using a content only hole filling technique and an image produced using a content plus texture hole filling technique.

FIG. 8 is another graphical depiction comparing an image 801 produced using a content only hole filling technique and an image 803 produced using a content plus texture hole filling technique using an embodiment of the invention. FIG. 8 shows that the content plus texture hole filling technique produces an image 804 that has better texture as well as smoother transitions. For example, the texture of the grass within the hole 804 is more similar to the texture of the nearby grass in the non-hole portion of image 803 than the texture of the grass within the hole 802 is to the nearby grass in the non-hole portion of image 801. Moreover, the transition between the border area 804 in image 803 is less abrupt and noticeable than the transition at the border area around filled hole 802 in image 801.

Techniques for Hole Filling Using Content, Texture, and Patch Match

Figure 9:
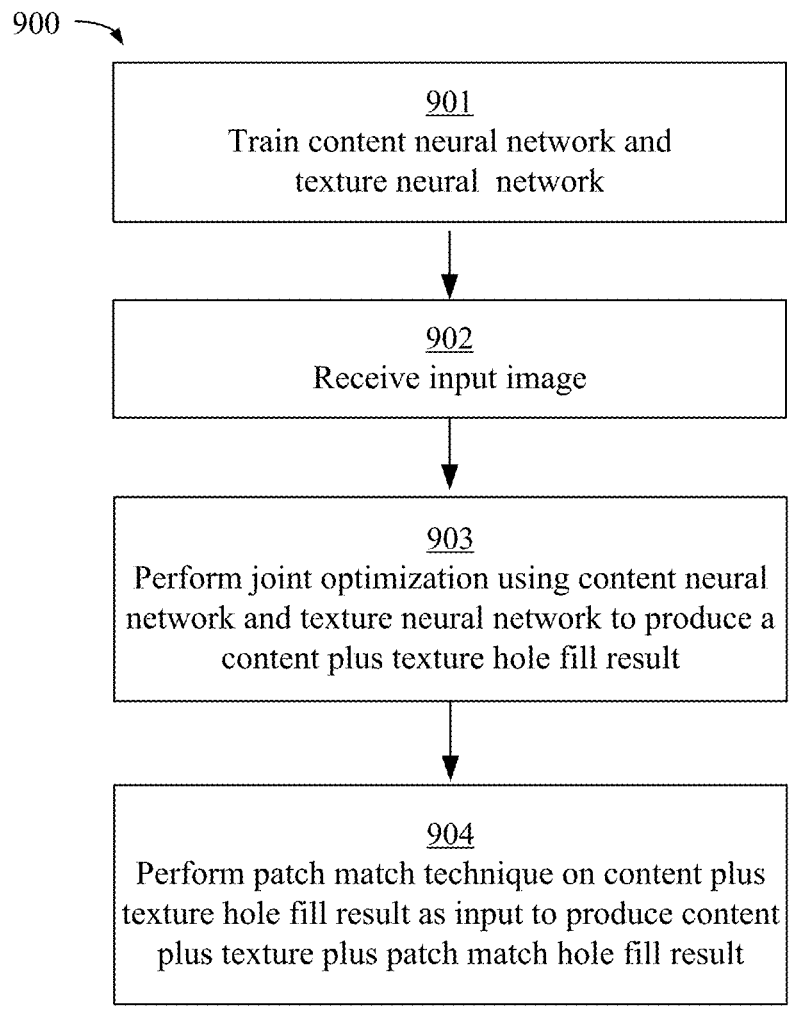
FIG. 9 is a flow chart illustrating an exemplary technique for hole filling using content, texture, and patch match.

FIG. 9 is a flow chart illustrating an exemplary technique 900 for hole filling using content, texture, and patch match. The technique 900 can be implemented on one or more computing devices that use one or more processors to execute algorithms of one or more operations defined in stored instructions. For example, the image editing engine 134 of FIG. 1 could perform these functions. The technique 900 involves training a content neural network and a texture neural network, as shown in block 901. The training of these networks can involve training the networks using any of the techniques discussed herein or any other technique that can train a neural network to predict content or identify texture respectively.

The technique 900 further involves receiving an input image, as shown in 902, and performing a joint optimization using the content neural network and the texture neural network to produce a content plus texture hole fill result, as shown in block 903. Exemplary techniques for producing such a result are discussed in the preceding sections.

The technique 900 further involves performing a patch match technique using the content plus texture hole fill result as input to produce a content plus texture plus patch match hole fill result, as shown in block 904. This involves adjusting patches in the image based on other patches in the image. Generally, patch match techniques compare pixel values of pixels within patches to encourage similar patches within an image. The patch match technique can make such comparisons at different image resolutions. An exemplary patch match technique is discussed in C. Barnes, E. Shechtman, A. Finkelstein, and D. B. Goldman, "PatchMatch: A randomized correspondence algorithm for structural image editing," TOG, 28(3):24:1-24:11, 2009, incorporated herein by this reference in its entirety. The patch match technique, among other things, can be used to add high resolution texture to the content plus texture result. Patch match techniques generally use small patches (e.g., 7×7, 5×5) in the same image as source patches in hole filling. The patches are used to fill in the missing region by first computing nearest neighbor patches and then copying the patches to the missing region.

Figure 10:
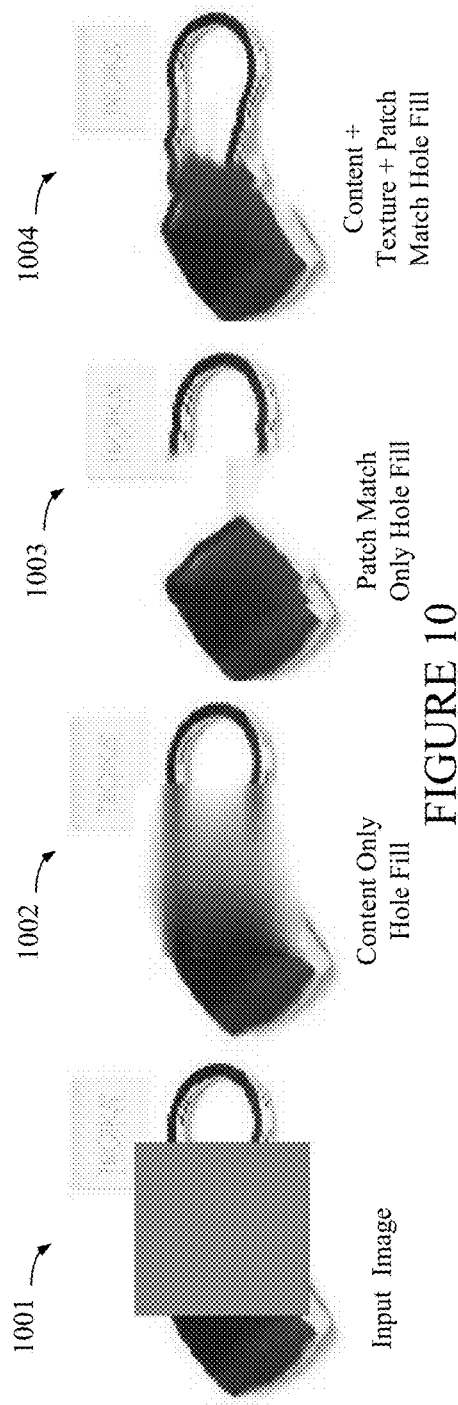
FIG. 10 is a graphical depiction of an input image and results of various techniques for filling a hole of the input image.

FIG. 10 is a graphical depiction of an input image 1001 and results of various techniques for filling a hole of the input image. Specifically, result image 1002 shows the results of a content only hole fill technique, result image 1003 shows the results of a patch match only hole fill technique, and result image 1004 shows the results of a content plus texture plus patch match hole fill technique. The result image 1004 of a content plus texture plus patch match hole fill technique provides superior content (e.g., the arm strap is complete and connected), texture (e.g., the arm strap pattern matches inside and outside the hole), and high resolution details (e.g., the pixel level details are consistently clear inside and outside of the hole).

Figure 11:
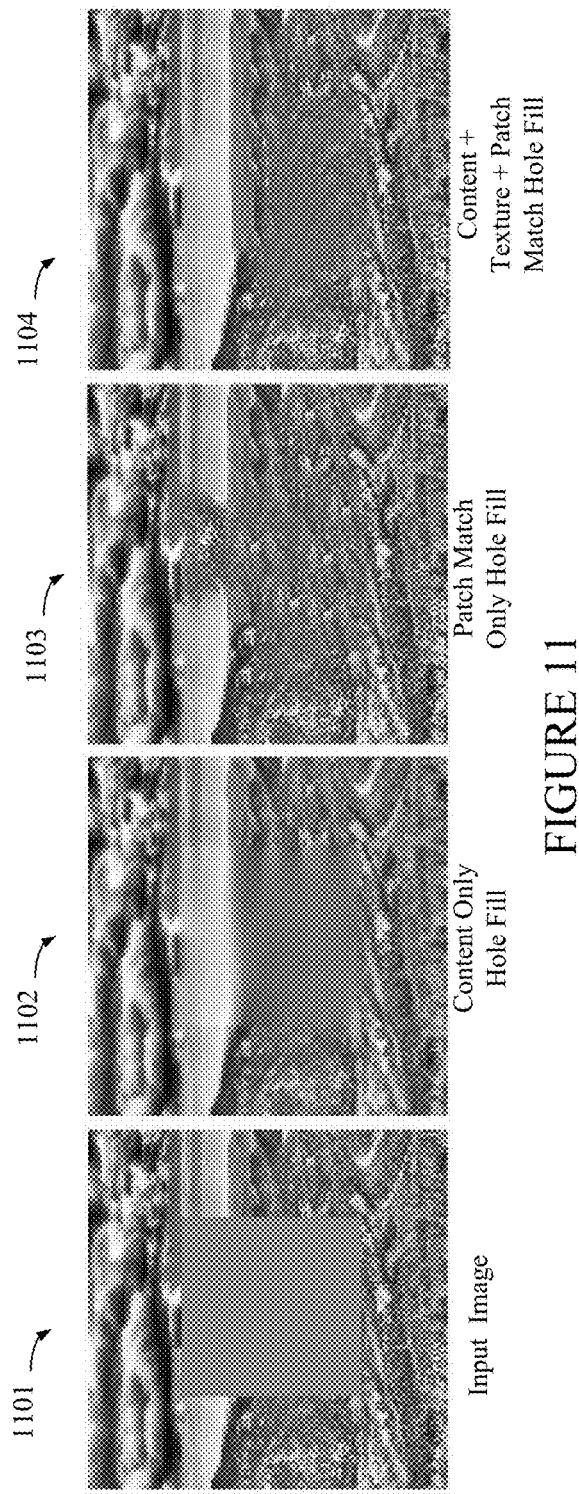
FIG. 11 is a graphical depiction of another input image and results of various techniques for filling a hole of the input image.

FIG. 11 is a graphical depiction of another input image 1101 and results of various techniques for filling a hole of the input image. Specifically, result image 1102 shows the results of a content only hole fill technique, result image 1103 shows the results of a patch match only hole fill technique, and result image 1104 shows the results of a content plus texture plus patch match hole fill technique. The result image 1104 of a content plus texture plus patch match hole fill technique provides superior content (e.g., the beach and water portions and boundaries of the hole are more accurate), texture (e.g., the patterns of the water and beach portions match inside and outside the hole), and high resolution details (e.g., the pixel level details are consistently clear inside and outside of the hole).

Exemplary Computing Environment

Figure 12:
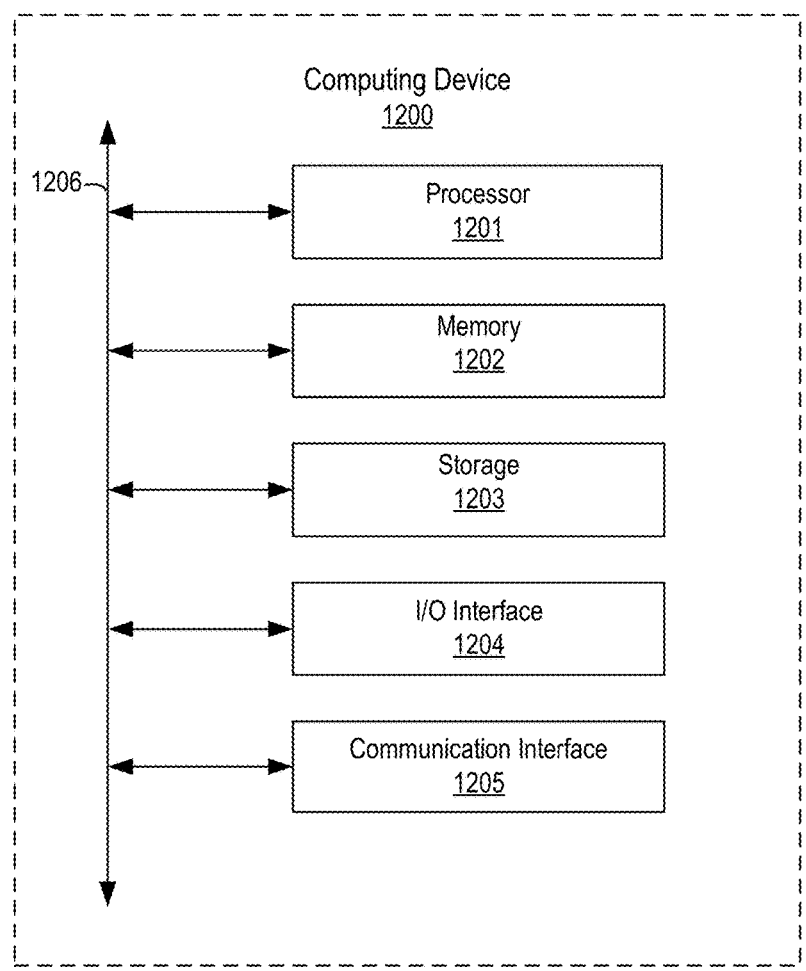
FIG. 12 is a block diagram depicting an example hardware implementation.

Any suitable computing system or group of computing systems can be used to implement the techniques and methods disclosed herein. For example, FIG. 12 is a block diagram depicting examples of implementations of such components. The computing device 120 can include a processor 121 that is communicatively coupled to a memory 122 and that executes computer-executable program code and/or accesses information stored in memory 122 or storage 123. The processor 121 may comprise a microprocessor, an application-specific integrated circuit ("ASIC"), a state machine, or other processing device. The processor 121 can include one processing device or more than one processing device. Such a processor can include or may be in communication with a computer-readable medium storing instructions that, when executed by the processor 121, cause the processor to perform the operations described herein.

The memory 122 and storage 123 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 120 may also comprise a number of external or internal devices such as input or output devices. For example, the computing device is shown with an input/output ("I/O") interface 124 that can receive input from input devices or provide output to output devices. A communication interface 125 may also be included in the computing device 120 and can include any device or group of devices suitable for establishing a wired or wireless data connection to one or more data networks. Non-limiting examples of the communication interface 125 include an Ethernet network adapter, a modem, and/or the like. The computing device 120 can transmit messages as electronic or optical signals via the communication interface 125. A bus 126 can also be included to communicatively couple one or more components of the computing device 120.

The computing device 120 can execute program code that configures the processor 121 to perform one or more of the operations described above. The program code can include one or more modules. The program code may be resident in the memory 122, storage 123, or any suitable computer-readable medium and may be executed by the processor 121 or any other suitable processor. In some embodiments, modules can be resident in the memory 122. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method, performed by a computing device, for hole filling in images that accounts for global structure and local texture, the method comprising:
   receiving an input image, the input image having a hole, the hole comprising a portion of the input image having unknown, removed, or missing content;
   selecting content to fill the hole, wherein the content to fill the hole is selected based on a content constraint and a texture constraint,
   wherein selecting the content based on the content constraint comprises selecting content that is consistent with a global structure of the image using a content neural network, the content neural network identifying the global structure of the image, and
   wherein selecting the content based on the texture constraint comprises selecting content with texture similar to the texture of the image outside the hole using a texture neural network, the texture neural network identifying image features that are used to assess texture similarity; and
   providing a result image by filling in the hole of the input image based on the content selected to fill the hole.

2. The method of claim 1, wherein selecting the content to fill the hole comprises optimizing a loss function, the loss function comprising a content term that applies the content constraint and a texture term that applies the texture constraint.

3. The method of claim 2,
   wherein the content neural network encodes high level features of the image representing the global structure of the image and decodes the high level features to produce an initial predication of content to fill the hole that is consistent with the global structure of the image; and
   wherein the content term penalizing selecting content to fill the hole that deviates from the initial prediction of content to fill the hole.

4. The method of claim 2,
   wherein the texture neural network is a classification network that identifies different image features using feature maps within a layer of the classification network that encodes mid-level image information, and
   wherein the texture term penalizing selecting content to fill the hole that includes patches with feature maps that differ from feature maps of patches outside of the hole.

5. The method of claim 2, wherein optimizing the loss function comprises using a backpropagation technique, wherein the backpropagation technique iteratively solves the loss function using an output prediction of the content to fill the hole from each iteration as an input for a next iteration.

6. The method of claim 5, wherein optimizing the loss function comprises determining the input for a first iteration using the content neural network on the input image with a mean value of a collection of natural images to initialize the hole.

7. The method of claim 2, wherein optimizing the loss function comprises iteratively solving the loss function,
   wherein the content constraint is applied to penalize deviation between a forward prediction of the content neural network and a previous prediction of the content neural network, and
   wherein the texture constraint is applied to penalize deviations of patches within the hole to patches outside the hole that are identified as being most similar, wherein the deviations are determined by comparing extracted image features that represent texture using a layer of the texture neural network that encodes mid-level image information.

8. The method of claim 1 further comprising enhancing the content selected to fill the hole using a patch match technique, wherein the content selected for the hole is input to the patch match technique, wherein the patch match technique adjusts pixels of patches inside the hole to match pixels of patches outside the hole.

9. The method of claim 1 further comprising training the content neural network to predict pixels for holes that approximate original content in the training images.

10. The method of claim 1 further comprising training the texture neural network for image classification, wherein a layer of the texture neural network encodes mid-level image information used to represent texture.

11. A computing device comprising:
    a means for receiving an input image having a hole, the hole comprising a portion of the input image having unknown, removed, or missing content; and
    a means for filling the hole of the input image using a content neural network to account for global content and a texture neural network to account for local texture, wherein the means for filling the hole comprises a processor executing instructions to optimize a loss function, the loss function comprising a content term that uses a content neural network and a texture term that uses the texture neural network.

12. The computing device of claim 11 further comprising a means for training the content neural network, the content neural network trained to encode image features based on non-hole image portions and decode the image features to fill holes.

13. The computing device of claim 11, further comprising a means for training the texture neural network, the texture neural network trained to extract image patch features that represent texture.

14. The computing device of claim 11, wherein the means for filling the hole comprises a means for selecting content to fill the hole based on a content constraint that uses the content neural network and a texture constraint that uses the texture neural network.

15. The computing device of claim 11 further comprising a means for performing a patch match technique to add high frequency texture within the hole.

16. A non-transitory computer-readable medium storing instructions, the instructions comprising instructions for:
    receiving an input image, the input image having a hole, the hole comprising a portion of the input image having unknown, removed, or missing content;
    selecting content to fill the hole based on a content constraint that uses a content neural network to account for global structure and a local texture constraint that uses a texture neural network to account for local texture including optimizing a loss function, the loss function comprising a content term applying the content constraint and a texture term applying the texture constraint; and
    filling in the hole of the input image based on the content selected to fill the hole.

17. The non-transitory computer-readable medium of claim 16, wherein optimizing the loss function comprises using a backpropagation technique, wherein the backpropagation technique iteratively solves the loss function using an output from each iteration as an input for a next iteration.

18. The non-transitory computer-readable medium of claim 17, wherein iteratively solving the loss function comprises:
    applying the content constraint by penalizing deviation between a forward prediction of the content neural network and a previous prediction of the content neural network; and
    applying the texture constraint by penalizing deviations of patches within the hole to patches outside the hole that are identified as being most similar, wherein the deviations are determined by comparing extracted image features that represent texture using a layer of the texture neural network that encodes mid-level image information.

* * * * *